(12) United States Patent
Hopkins et al.

(10) Patent No.: US 6,344,656 B1
(45) Date of Patent: Feb. 5, 2002

(54) SURFACE MEASURING APPARATUS HAVING RELATIVE DISPLACEMENT BETWEEN A PROBE AND ITS CARRIAGE

(75) Inventors: Ian Hopkins, Houghton-on-the-Hill; Keith Hall, Thurcaston; Anthony Smith, Carlton; Dipak Daudia, Humberstone, all of (GB)

(73) Assignee: Taylor Hobson Limited (GB)

( * ) Notice: Subject to any disclaimer, the term of this patent is extended or adjusted under 35 U.S.C. 154(b) by 0 days.

(21) Appl. No.: 09/555,730

(22) PCT Filed: Dec. 3, 1998

(86) PCT No.: PCT/GB98/03614

§ 371 Date: Jul. 21, 2000

§ 102(e) Date: Jul. 21, 2000

(87) PCT Pub. No.: WO99/28703

PCT Pub. Date: Jun. 10, 1999

(30) Foreign Application Priority Data

Dec. 4, 1997 (GB) ............................... 9725779

(51) Int. Cl.[7] .............................................. G01N 21/86
(52) U.S. Cl. .................... 250/559.22; 356/376
(58) Field of Search ................. 250/559.22, 559.29, 250/559.33, 207.3; 356/375, 376, 239.1, 239.2, 237.2, 237.5

(56) References Cited

U.S. PATENT DOCUMENTS

| 4,255,862 A | 3/1981 | Nakamura ................... 33/174 |
|---|---|---|
| 4,509,263 A | 4/1985 | Andrie et al. .................. 33/169 |
| 4,538,911 A | 9/1985 | Heynacher et al. ......... 356/358 |
| 5,291,662 A | 3/1994 | Matsumiya et al. .......... 33/503 |
| 5,304,773 A * | 4/1994 | Killian et al. .......... 219/121.78 |
| 5,548,405 A | 8/1996 | Motosugi .................... 356/376 |

FOREIGN PATENT DOCUMENTS

| DE | 3419546 | 11/1985 |
|---|---|---|
| EP | 240151 | 10/1987 |
| EP | 356513 | 3/1988 |
| GB | 1571397 | 7/1980 |
| GB | 2218277 | 11/1989 |
| GB | 2237661 | 5/1991 |
| GB | 2251945 | 7/1992 |
| GB | 2306654 | 5/1997 |

* cited by examiner

Primary Examiner—Que T. Le
(74) Attorney, Agent, or Firm—Cesari and McKenna, LLP

(57) ABSTRACT

A metrological instrument for measuring surface characteristics such as surface form of a component (300). The instrument includes a slideway (32) to cause relative movement between a surface sensing probe (84) and the component which allows the probe to traverse a surface of the component. A probe carriage (80) supports the probe to allow the probe to move as a body in a measurement direction relative to the carriage so as to follow a surface being sensed. An optical sensor (82) provides a signal indicative of the displacement of the probe relative to the probe carriage. A controller (83) acts in response to a signal from the optical sensor, to move the probe carriage so as to maintain the probe in an operational range. A further sensor (11) measures measurement of displacement of the probe in the measurement direction as it follows a surface during use of the instrument.

18 Claims, 13 Drawing Sheets

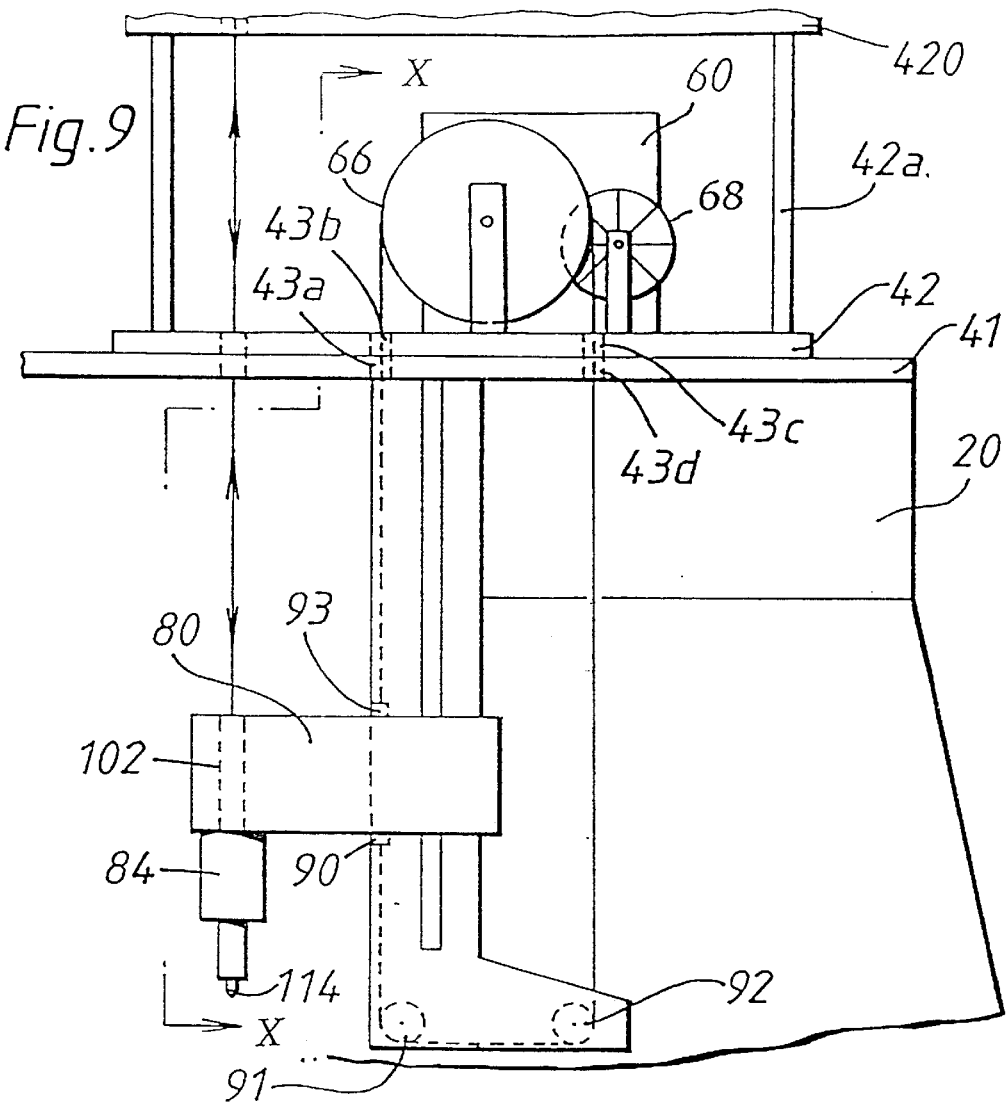
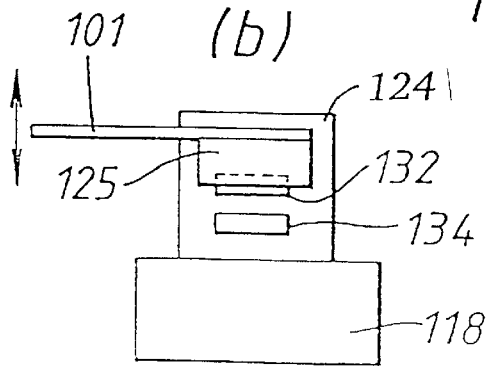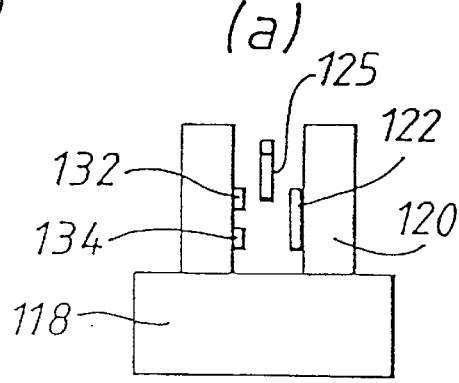

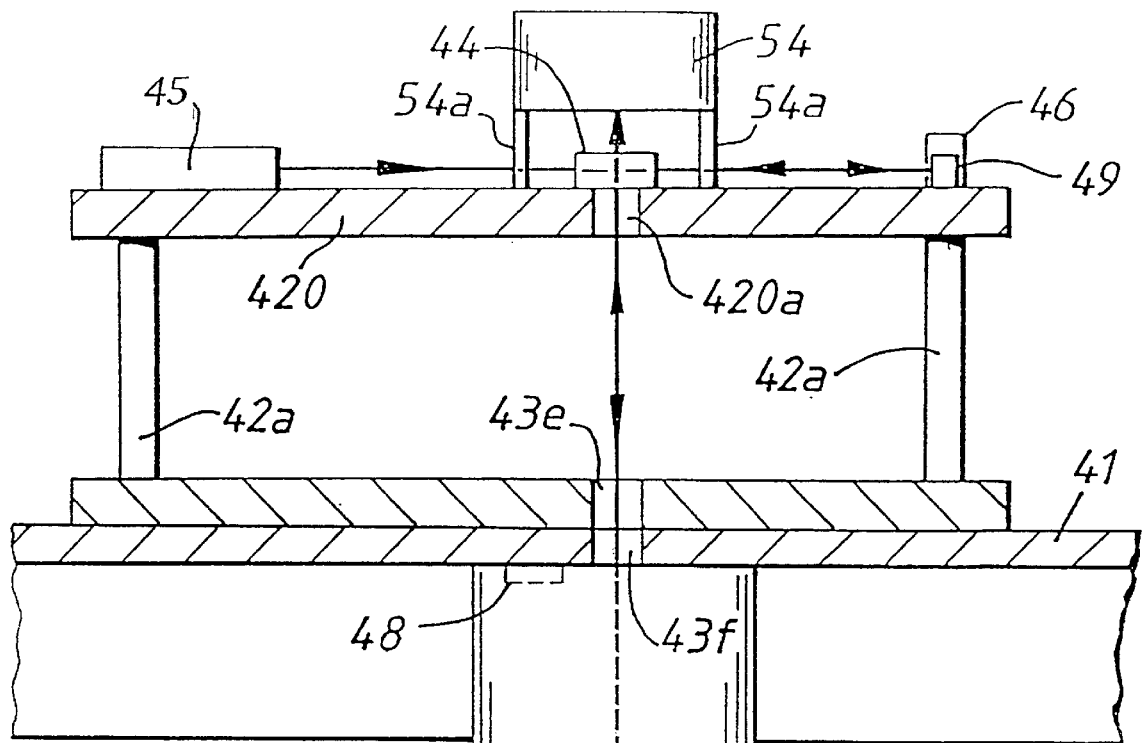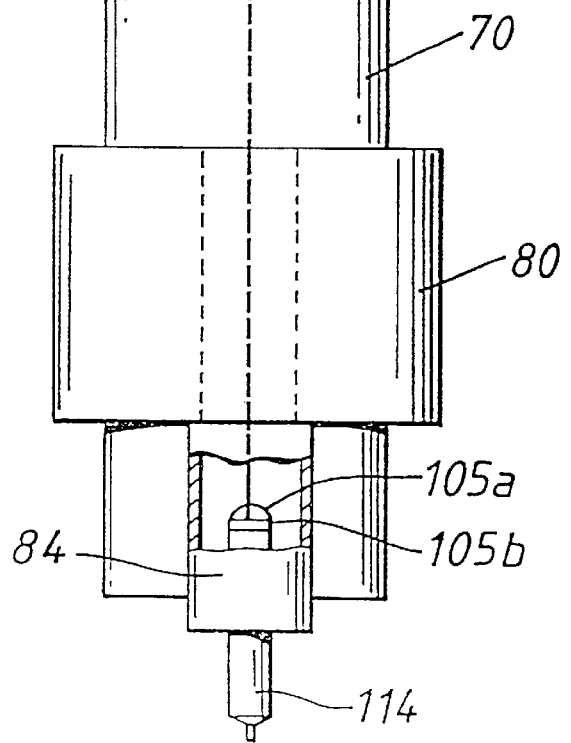
Fig. 14

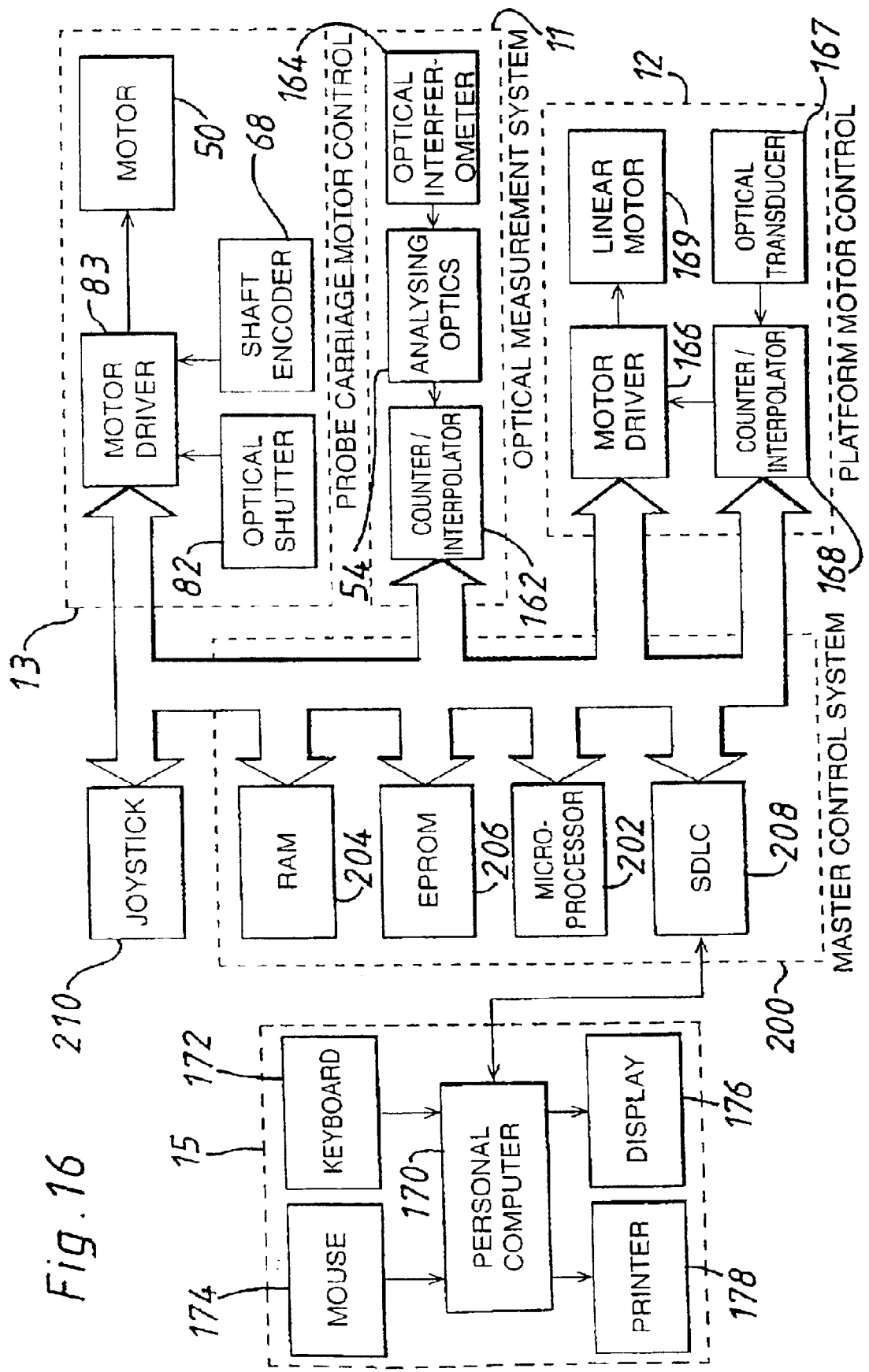

SURFACE MEASURING APPARATUS HAVING RELATIVE DISPLACEMENT BETWEEN A PROBE AND ITS CARRIAGE

The present invention relates to apparatus for measuring a surface characteristic of a component such as a workpiece. The invention has particular but not exclusive application in the measurement of the form or profile of a surface, where form or profile is understood to relate to deviations from linearity with irregularities having wavelengths of the same order as the dimensions of the surface; for example the surface may be spherical or cylindrical or may bow inwardly or outwardly.

Taylor Hobson Limited of Leicester, England manufacture a range of metrology instruments and in particular the publicly available "Form Talysurf" range of instruments for measuring the surface form or profile of an object or component.

In the Form Talysurf instrument, a stylus carried by a support arm is mounted such that it can pivot in order to allow a stylus tip to follow the surface of a component during relative movement of the stylus and the surface. The displacement of the stylus as it follows the surface is detected using a transducer and the output of the transducer is logged by data logging and processing equipment (e.g. a personal computer) together with data indicating the position of the tip of the stylus along the component in order to provide data giving a measurement of the surface profile or form of the component. The stylus or the surface or both may be moved so as to allow the construction of a two or three dimensional surface map which can then be displayed on a visual display unit or printed as a hard copy using a variety of known techniques.

One type of position transducer typically used in connection with such a stylus in order to detect the position of the stylus tip as it follows the surface is a linear variable differential transducer (known as a LVDT).

The range of movement within which measurements may be taken by such apparatus is limited This makes such apparatus unsuitable for use in the measurement of the surface form or profile of components or objects having a relatively large (tens or hundreds of millimeters) variation in surface form.

SUMMARY OF THE INVENTION

In one aspect, the present invention provides a metrological instrument wherein a surface sensing probe is maintained within an operational range using first, for example, optical sensing means and axial displacement of the sensing probe in response to surface characteristics of the surface being sensed during relative movement between the surface and the probe is determined using a separate measurement system which may, for example, comprise an optical interferometer. This enables the surface sensing probe to rake measurements over a relatively large range.

In one aspect, the present invention provides a metrological apparatus for measuring surface characteristics of a surface of an object such as a workpiece, comprising: an elongate stylus support member for carrying at one end a stylus for sensing a surface of an object; means for effecting relative movement between the support member and a surface to be measured to enable a stylus carried by the support member to traverse the surface; a carriage carrying the stylus support member and enabling a stylus carried by the support member to be displaced relative to the carriage in a direction parallel to its length in response to variations in the surface being sensed as a stylus carried by the stylus support member traverses the surface; first sensing means for optically sensing the displacement of the stylus support member relative to the carriage and for providing an output signal representative of the position of the stylus support member relative to the carriage; control means for moving the carriage in response to the output signal of the optical sensing means so that a predetermined positional relationship exists between the carriage and the stylus support member; and second sensing means for sensing the displacement of a stylus carried by the support member as the stylus traverses a surface being sensed This enables measurement of the form or profile of a surface whose surface form varies over a range greater than the operational range of the stylus to be achieved because the first sensing means and control means act, in use, to maintain the stylus within its operational range regardless of the actual distance the stylus has moved in the measurement direction as it traverses the surface being measured. Such features enable the apparatus to be of compact and simple construction. Additionally the apparatus should be less sensitive to external variations such as temperature.

In one aspect the present invention provides a metrological apparatus providing an air bearing for supporting a surface sensing probe to allow displacement of the probe as it follows a surface being sensed during relative movement between the surface and the probe, the apparatus having means for maintaining the probe within an operational range in relation to the air bearing and separate measurement means for determining the displacement of the probe as it follows the surface being measured. In such an aspect, the air bearing provides low stiction (static friction) which improves repeatability. At least one of the maintaining and measurement means may be an optical sensing system, such as an optical interferometer. In such a case a greater range and resolution and a wore linear response than an LVDT can be provided.

In one aspect, the present invention provides a metrological apparatus comprising a turntable for supporting a workpiece, and a gantry carrying a carriage for supporting a sensing probe above the turntable to allow the probe to move towards and away from the turntable, means being provided for allowing relative measurement between the turntable and the probe so as to cause, in use, the probe to traverse a surface of a workpiece carried by the turntable. For example, the turntable may be mounted so as to be slidable beneath the gantry. This enables the sensing probe to traverse different measurement paths across the surface with the different measurement paths being at an angle to one another and with the angle being determined by the degree of rotation of the turntable between measurements. This enables, for example, a three dimensional profile of a non-rotationally symmetric component or object such as an aspheric lens to be produced. The carriage may comprise an air bearing for the probe. The probe may comprise a stylus support for carrying a removable stylus. Means may be provided for maintaining the probe in an operational range with respect to the carriage independently of a measurement system for determining the displacement of the probe as it follows the surface.

In one embodiment, the present invention provides a metrological apparatus for measuring surface characteristics of a component the apparatus comprising:
  a probe carriage for supporting a probe to allow the probe to move axially relative to the carriage so as to follow a surface being sensed;
  moving means for causing relative movement between the probe carriage and a component to allow a probe carried by the carriage to traverse a surface of the component;

optical sensing means for providing a signal indicative of displacement of the probe relative to the probe carriage;

control means for controlling movement of the probe carriage in said axial direction in response to the signal provided by the optical sensing means to maintain the probe in an operational range relative to the probe carriage; and further sensing means for providing a measurement of displacement of the probe as it follows a surface during use of the apparatus.

BRIEF DESCRIPTION OF THE EMBODIMENTS

Embodiments of the invention will now be more fully described by way of example, with reference to the accompanying drawings in which:

FIG. 9 is a further diagram showing in side view the driving arrangement shown in FIG. 7;

FIGS. 10a and 10b are diagrams showing side and front views respectively of an optical sensing arrangement of tho apparatus shown in FIG. 1;

FIG. 14 is a part-sectional diagram similar to FIG. 9 but showing the optical measurement system.

FIG. 16 is a block diagram showing the control systems of the apparatus shown in FIG. 1.

DETAILED DESCRIPTION OF THE EMBODIMENTS

Figure 1:
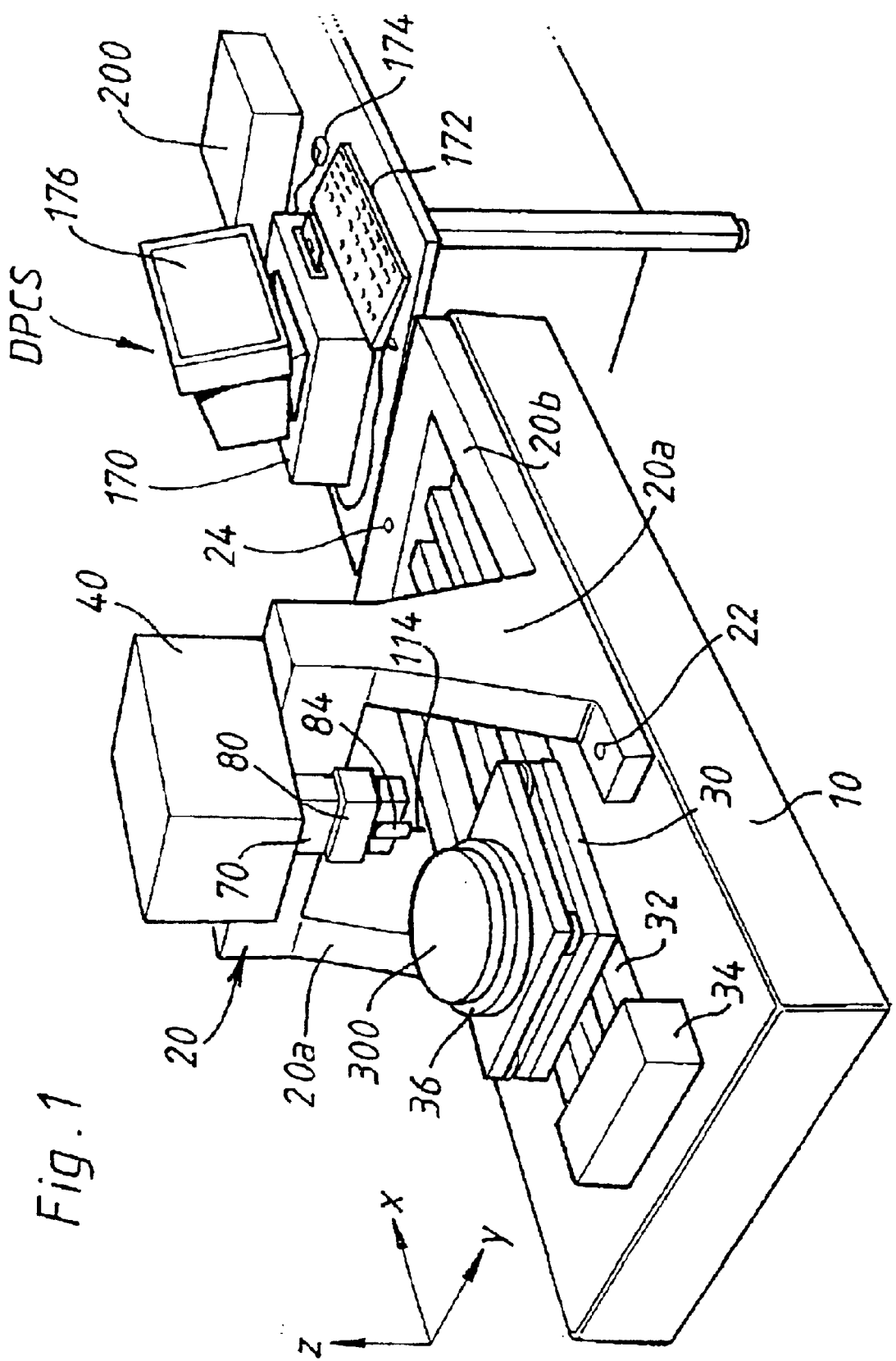
FIG. 1 is a schematic diagram of apparatus embodying the invention.

FIG. 1 shows a schematic perspective view of apparatus embodying the invention. Worktop 10 is a granite worktop having three supports (not shown) to provide a three point mounting. The supports have a conventional adjustment mechanism (not shown) in order to allow the worktop 10 to be levelled. The weight of the worktop 10 reduces vibrations which might otherwise have an adverse effect on the measurement process. The worktop 10 is preferably mounted on conventional anti-vibration mounts (not shown) so as to reduce floor transmitted noise.

In the arrangement shown in FIG. 1, x and y axis are defined as lying along the plane of the worktop 10, and a z-axis is orthogonal thereto.

An electrically controllable x-axis slideway 32 is mounted on the top surface of the worktop 10. A platform is slidable on air bearings (not shown) along a two-rail slideway 32. Movement of the platform 30 in the x-direction along the slideway 32 is achieved using a linear motor (not shown). The movement of the platform is controlled via a platform control system 12 in a manner to be described below with reference to FIG. 16.

Movement of the platform 30 is capable of being controlled to an accuracy in the x-direction of typically ±10.0 $\mu$m (micrometers). Such accuracy is achieved using suitable feedback circuitry comprising a position sensing device such as an optical interferometer transducer comprising a diffraction grating arrangement provided along the slideway 32 and a detection system provided upon a part of the platform 30 so as to move with the platform 30. The detection system comprises a light source, interferometer, analysing optics and a counter/interpolator for counting the number of fringes and fractions of fringes.

Typical traverse speeds of the platform 30 are 0.5, 1.0, 2.0 and 5.0 mm/s (millimeters per second) depending upon the resolution of the data selected by the user.

In this example, the slideway arrangement comprises an Aerotech ATS 8000 version (400 mm traverse) air bearing system with a Unidex 100 stand alone controller which forms part of the platform control system 12.

A turntable 36 is mounted upon the platform 30 via a mounting assembly. A component 300 to be measured is mounted securely to the turntable 36 using a conventional mounting or clamping mechanism (not shown). In the example shown the component is an aspheric lens. The turntable 36 may, as will be described below, be manually rotatable by a user and its position in the y direction may also be manually user adjustable. The platform 30 includes levelling means as will be described later.

Provided on the worktop 10 is support gantry 20. The gantry 20 has two legs 20a supporting a compartment 40 substantially above the turntable 36. The compartment 40 contains an optical measurement system OMS and other components as will be described below. A support slideway 70 is suspended from the gantry so that the slideway extends along the z-axis. The legs 20a of the gantry 20 are connected to each other by a support base 20b which surrounds one end of the x-axis slideway 32. The support base is attached to the worktop 10 by three attachment bolts (two of which 22, 24 are shown) providing a three point mounting. Two of the attachment bolts (22, 24) are adjustable and by adjustment of these bolts the gantry 20 and thus the compartment 40 and z-axis slideway 70 may be levelled relative to the worktop 10. Such adjustment is preferably carried out upon installation of the machine and not by a user as the orientation of the z-axis slideway 70 is important in ensuring the accuracy of the measurement of form.

A carriage 80 is slidable along the carriage support slideway 70 on conventional air bearings (not shown). Typically the carriage support slideway 80 is 180 mm in length.

A probe 84 is carried by the carriage 80. A stylus arm114 (which includes a stylus (not shown)) for contacting and following a surface to be measured is carried by and is movable relative to the probe housing.

The position of the stylus arm 114 as it follows a surface of a component or workpiece is sensed using the optical measuring system OMS to be described below with reference to FIGS. 12 to 16. The stylus arm 114 is maintained within an operational range relative to the carriage 80 by a carriage motor control system CMC 13 which will be described below with reference to FIGS. 10, 11 and 16. The overall control of the apparatus and the logging of form measurements is conducted by the master control system for subsequent processing and display by a personal computer (PC) system 15, as will be described later with reference to FIG. 16.

Figure 2:
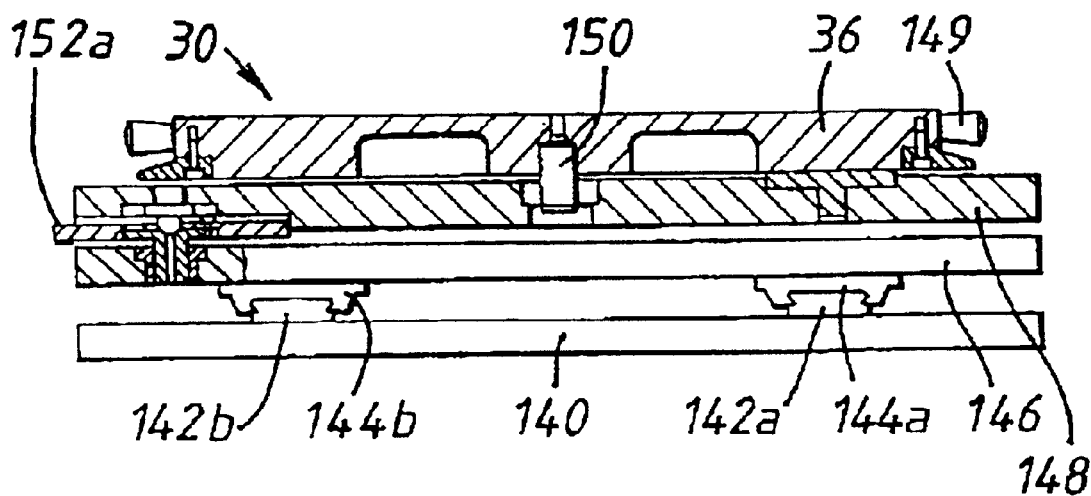
FIG. 2 is a cross sectional view and FIG. 3 is a plan view of a turntable assembly of apparatus shown in FIG. 1, upon which a component to be measured is mounted.

The turntable 36 is mounted ton the platform 30 by an assembly consisting, as shown most clearly in FIG. 2, of a lower platen 140, a middle platen 146 and an upper 148 which are mounted one on top of each other.

The lower platen 140 is securely mounted using bolts (not shown) to the platform 30 (not shown in FIG. 2) so as to be substantially parallel to the x-y plane. User adjustment between the lower platen 140 and the platform 30 is not provided. A pair of tracks 142a, 142b extend in the y direction of FIG. 1 along the lower platen 140.

Figure 3:
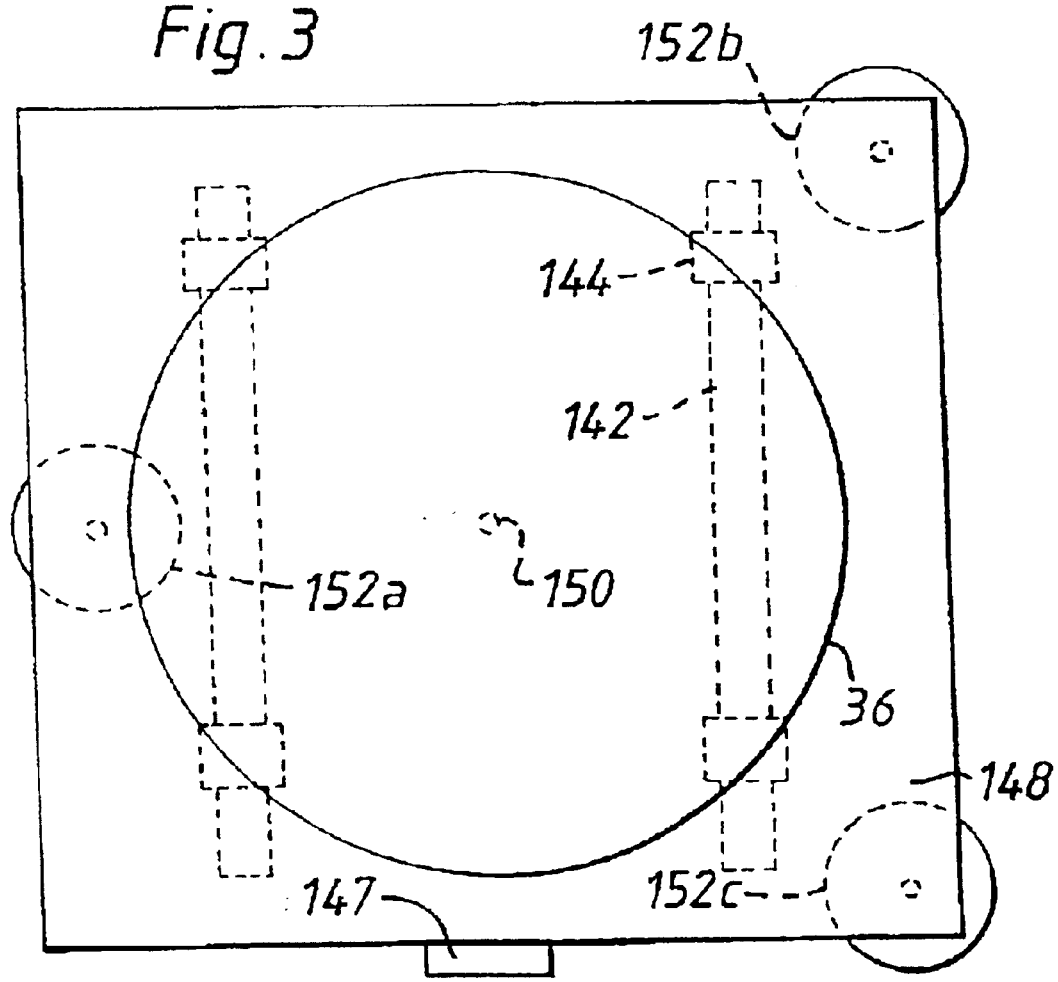

The underside of the middle platen 146 is provided with riders 144a, 144b engaging the tracks 142a and 142b. In this example there are a pair of riders for each track spaced apart along the length of the track (as can be seen in FIG. 3) Adjustment of the middle platen 146 with respect to the lower platen 140 is provided by a manually rotatable knob 147 (FIG. 3). From the knob protrudes a shaft (not shown) formed with a fine pitched screw thread. The threaded shaft passes through a support provided on the lower platen 140 such that the end of the shaft abuts the middle platen 146. The middle platen 146 is spring bias by springs (not shown) so as to remain in contact with the end of the shaft. Thus rotation of the knob 147 causes the end of the shaft and thus the middle platen 146 to move in the y direction, being against the spring biasing. The shaft preferably lies at an angle to the x-y plane to achieve a reduction ratio in y-direction movement and thus aid fine adjustment. Typically 10 mm movement in the y-axis direction is provided.

The upper platen 148 is supported on top of the middle platen 146 by three ball pivot bearings 152a, 152b, 152c (only 152a being shown in FIG. 2, all being shown in FIG. 3) located at respective apices of a triangle and towards the edges of the middle platen 146. Of these bearings one is fixed, one adjustable on installation of the instrument and the third is user adjustable. Preferably the user adjustable bearing is selected so that tilt of platen along the x-axis only can be adjusted. Each bearing has an associated adjustment spring (not shown) which biases the two platens together. Typically, adjustment over a distance of 3 mm in the z direction is provided.

The turntable 36 is supported by a central bearing or spindle 150 on the surface of the upper platen 148 so as to be manually rotatable by a user. The central bearing 150 is preferably a conventional ball race bearing spindle.

The perimeter of the turntable 36 and the top platen 148 are preferably marked (for example every ten degrees) so as to assist in the angular setting of the turntable 36. Projections 149 are provided equidistantly spaced around the turntable 36 (typically every 30°) to allow the turntable to be easily manually rotated.

Although all the above turntable adjustments are manual adjustments, the same could be motorised and computer controlled either locally or remotely using suitable positional feedback circuitry such as optical interferometer transducer systems of the type mentioned above. When computerised control of the y-axis movement is provided this may allow the provision of an auto-crowning facility when the component is, for example, an aspheric lens so as to enable the crown of the lens to be determined by determining which point of the surface of the lens is highest above the turntable.

Figure 4:
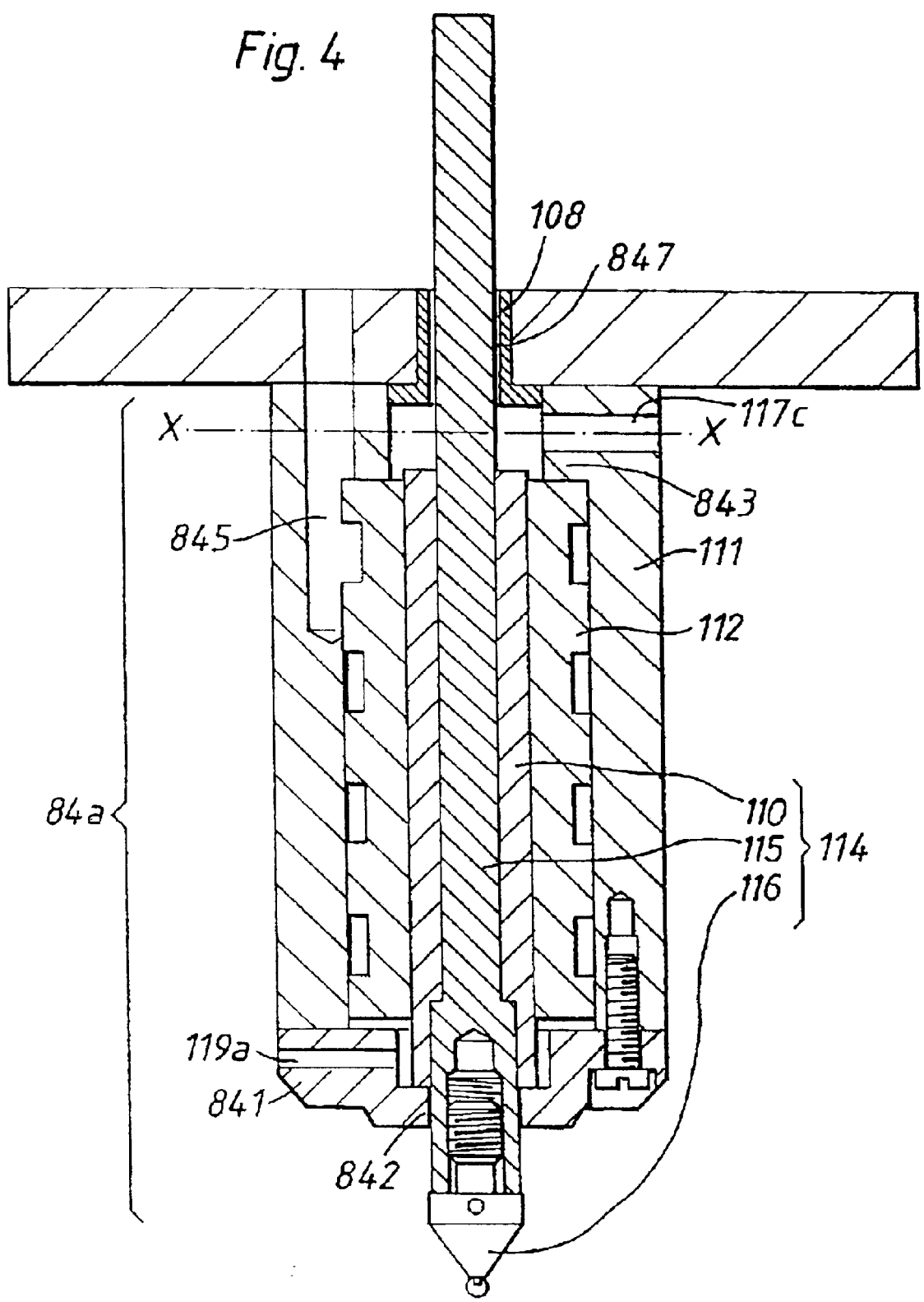
FIG. 4 is a diagram showing a cross-sectional view of the lower portion of a probe for use in apparatus embodying the invention.
Figure 5:
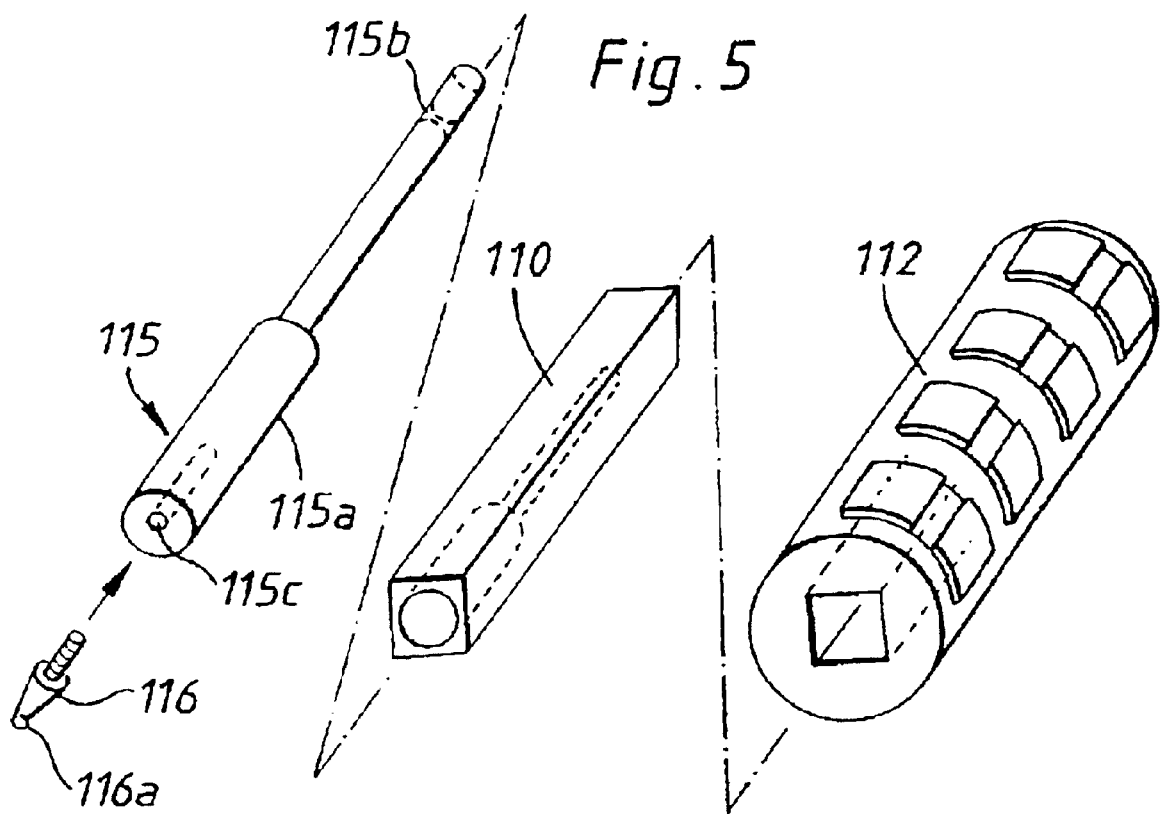
FIG. 5 is a diagram showing an exploded perspective view of a lower part of the probe shown in FIG. 4.
Figure 6:
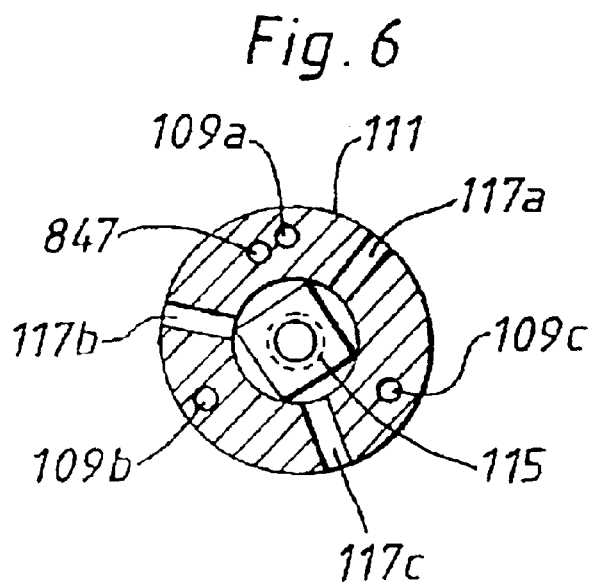
FIG. 6 is a diagram showing a cross-sectional view taken along line X—X of FIG. 4.
Figure 7:
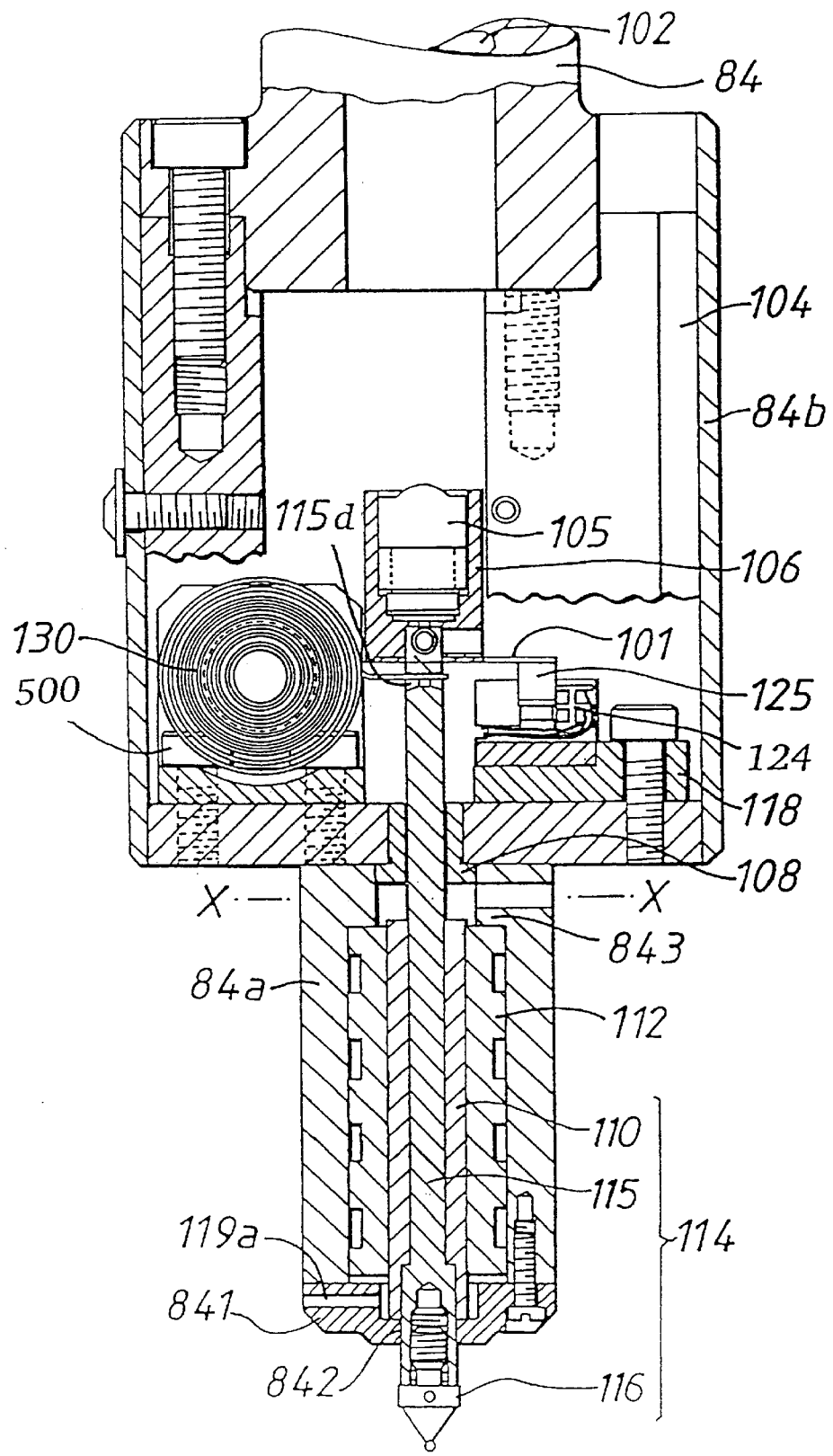
FIG. 7 is a part-sectional diagram of part of the apparatus shown in FIG. 1 showing a probe carriage driving arrangement.

The arrangement of the probe 84 will now be described with reference to FIGS. 4 to 7. FIG. 4 is a cross sectional view (taken in the z-axis direction of FIG. 1) of the lower portion of probe, FIG. 5 is an exploded perspective view of the stylus arm 114 and associated components, FIG. 6 is a cross sectional view taken in the direction X—X in FIG. 4 (that is in the x-axis direction of FIG. 1) through a lower portion of the probe when located in the housing and FIG. 7 is a cross sectional view taken along the same section as FIG. 4 and showing the whole of probe 84.

The stylus arm 114 is accommodated within a lower portion 84a of the probe 84 so as to be moveable relative thereto. The stylus arm 114 comprises rod 115, stylus 116 and shaft 110. The rod 115 comprises an elongate body of circular cross-section having an upper portion 115b of smaller cross sectional diameter than a lower portion 115a. The lower end of the rod 115 is formed with a threaded bore 115c for receiving a stylus 116.

The stylus 116 is a conventional ball stylus of the type having an upper threaded cylindrical portion, to allow it to be attached to the rod 115, extending to a conical surface terminating in a stylus tip which is typically a sphere 116a of 0.5 mm radius made from sapphire or ruby, for example, for contacting the surface of the component to be measured. Alternatively the stylus may be a cone having a typical tip angle of 60° and typical tip radius of 10 mm manufactured from diamond. Such a stylus may provide increased resolution on certain components.

The shaft 110 comprises an elongate body of square cross section formed along its central longitudinal axis with a bore having an upper portion of diameter corresponding to the diameter of the upper portion 115b of the rod 115 and a lower portion of a diameter corresponding to the diameter of the lower portion 115a of the rod 115. The rod 115 is positioned within the bore of the shaft and bonded therein. The bore is formed such that a small amount of the lower end of the rod 115 protrudes from it. The lower end face of the shaft 110 rests in a recess of an end cap 841 of the probe when the stylus arm 114 is in an extreme low end position, as shown in FIG. 4, so as to retain the stylus arm within the probe 84. The rod 115 extends through a central aperture 842 of the end cap 841.

The shaft 110 is supported so as to be axially movable, that is movable parallel to its length, within a square cross-section bore of a sleeve 112. The sleeve 112 is secured within cylinder 111 and is glued in place abutting a radially inwardly extending flange 843. The an sleeve 112 is thus fixedly mounted to a bore within cylinder 111. Sleeve 112 (as shown most clearly in FIG. 5) comprises an elongate body having circular outer cross-section the diameter of which corresponds to that of the internal bore of the cylinder 111. The exterior surface of the sleeve 112 is for med wit h axially and circumferentially extending channels to allow the passage of air as described below. The bore and the shaft 110 may be of a cross-sectional shape other than square provided that the selected cross-section is such as to prevent relative rotation. Alternatively, some other form of keying arrangement may be provided to allow axial but prevent radial movement between the sleeve 112 and the shaft 110.

An air supply passage 845 extends from the upper housing 84b through cylinder 111 to communicate with an upper circumferential channel in the shaft 112 for supplying compressed air so as to provide the air bearing.

Air is expelled from the air bearing via two sets of air expulsion holes. Each set of air expulsion holes comprises, in this example, three circumferentially spaced holes which extend from the outside of the cylinder 111 so as to communicate with chambers provided in the cylinder 111 above and below the sleeve 112. The upper set of air expulsion holes 117a to 117c which are provided just above the upper extent of the sleeve 112 and are shown in the cross section of FIG. 6. The lower set of air expulsion holes (only one, 119a is shown in FIG. 4) are provided just below the lower extent of the sleeve 112. Preferably the upper and lower sets of air expulsion holes are spaced at different angles relative to a reference radius of the cylinder 111.

Referring to FIG. 6 and FIG. 7, the lower portion 84a of the probe 84 is separately formed from the upper portion of the housing and comprises a cylinder 111 with end cap 841 at its base and attached to the upper portion of the probe by screws (not shown) which extend through respective holes in the base 844 of the upper portion of the probe (not shown) to locate in threaded holes in the flange 843 of the lower portion. In the example shown there are three threaded holes a, b and c and a corresponding number of screws. Of course any other conventional securement technique could be utilised.

The lower portion of the probe 84a is axially located relative to the upper portion 84b by locating spigot 108 which precisely abuts the inner surface of the cylinder 111 and the inner surface of the air supply passage 845 communicating with the upper portion of the probe 84b.

With reference to FIG. 7 (in which air supply passage 845 is not shown), the top of the rod 115 extends through spigot 108 in the base of the upper portion 84b of the probe. The top end of the rod 115 carries a radially extending support arm 101 which is bent at one end to form a shutter 125 of an optical sensing arrangement to be described in greater detail hereinafter. The outer end of a coil spring 130 is inserted through a transverse hole 115d in the rod 115 formed diametrically opposite to the support arm 101 and a short distance from the top end of the rod 115. The coil spring 130 is provided on support means 500 attached to the inside of the probe. The coil spring 130 biases the rod 115 and thus the stylus arm 114 towards the component to be measured thus supplementing the gravitational bias force in this example. Typically the force is 1.5 g but this may depend on the surface form or the material of the component to be measured. Alternatively two bias springs may be provided preferably diametrically opposed across the rod 115. In this case the first bias spring may be arranged so as to compensate for the mass of the stylus arm 114 and the second may be user adjustable enabling the user to set the bias in accordance with a number of factors, in particular the surface shape of the component and the traverse speed of the probe. The coil spring is optional and could be omitted in cases where gravitational biasing is considered sufficient. Alternatively any suitable type of spring or other form of biasing means such as an LVDT biasing arrangement could be used.

A support 106 provided on the top of the stylus arm 114 (in the embodiment also on top of the support arm 101) which supports a reflector 105 of the optical measurement system OMS to be described later.

Figure 8:
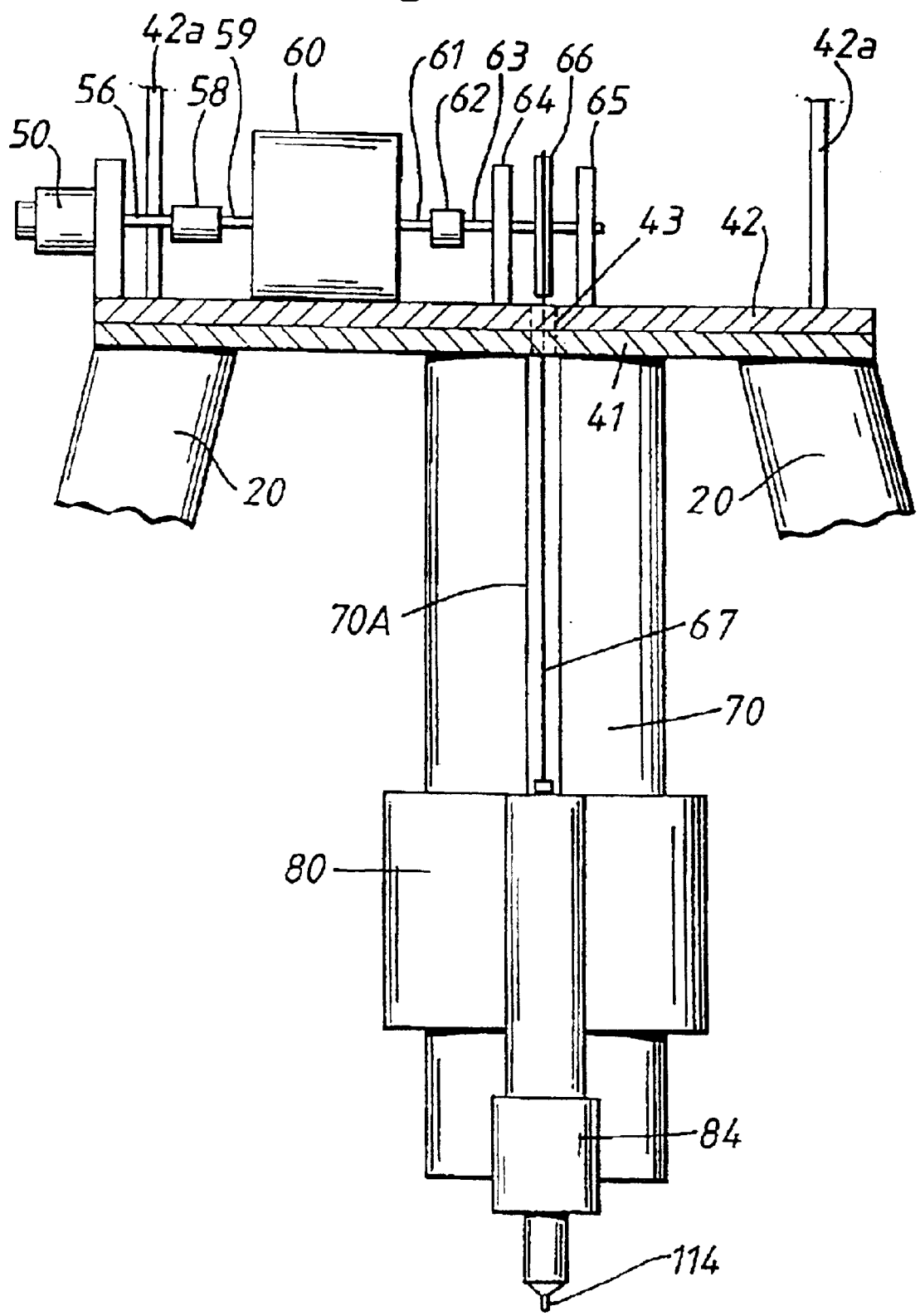
FIG. 8 is a diagram showing a cross-section view of the whole of the probe of FIG. 4.

The arrangement for controlling the position of the carriage 80 carrying the probe 84 will now be described with reference to FIGS. 8 and 9. FIG. 8 is a part-sectional view taken along the line X—X in FIG. 9 and FIG. 9 a view in the y-axis direction of FIG. 1. In positional control of the carriage 80 have been omitted from these figures as have top and side walls of the c compartment 40.

The base of the compartment 40 is denoted as surface 41. The carriage drive arrangement is mounted on a support plate 42 secured to the base 41. The shafts 42a secured with located holes in the support plate are provided to support the optical measurement system OMS as will be described below with reference to FIGS. 12 to 14. The carriage 80 is held in the desired position along the support slideway 70 by cable 67. The cable 67 is securing nut 90. The cable extends down the support slideaway 70 lying in a channel 70a and then passes around pulley wheels 91 and 92 and back up towards the compartment 40 at the back of the slideway 70. It thereafter passes through apertures 43c and 43d in surfaces 41 and 42 respectively and around the upper part of feedwheel 66 in which it lies in a circumferential groove. The cable 67 thereafter passes down through apertures 43a and 43b in surfaces 41 and 42 and down slideway 70 (lying in channel 70a) and is secured to the top of carriage 80 by a conventional adjustable security bolt 93. Adjustment of bolt 93 tensions the cable so that rotation of feedwheel 66 causes the carriage 80 to move up and down the slideway 70. The cable is preferably secured to the feedwheel 66 at one point to assist in the prevention of slippage.

The feed wheel 66 is fixedly mounted to a coaxial shaft 63 which is driven by electric motor 50 through the action of a step-down gear box 60, typically of ratio 2500:1, the drive train thus being motor shaft 56 to gearbox input shaft 59 (via shaft coupling 58) and gearbox output shaft 61 to the feed-wheel shaft 63 (via shaft coupling 62). The shaft 63 of the feed-wheel 66 extends through and is axially rotatable relative to two supports 64, 65.

As shown in FIG. 9 a slotted opaque wheel (or a transparent wheel with radial opaque lines) of shaft encoder 68 is mounted to a second output shaft of the gearbox 60. Light transmitted from an LED (not shown) to a light receiving device such as photodiode or photo transistor (not shown) is periodically interrupted by the wheel as it rotates. Signals from the shaft encoder are used to control the position of the carriage as will be described below with reference to FIG. 16.

Movement control of the probe carriage 80 is conducted using the optical sensing arrangement associated with the stylus arm 114 which will now be described with reference to FIGS. 7, 10a and 10b.

FIG. 10a is a side view (with respect to the view in FIG. 4) and FIG. 10b is a view from the same direction as FIG. 4 of the optical sensing arrangement. The optical sensing arrangement is used to maintain the position of the rod 115 relative to the probe carriage 80 within an operational range, typically 0.5 mm to 1 mm approximately constant, throughout the measurement process. This may allow a reduction in errors caused for example by frictional forces between the stylus arm 114 and its housing 84 or uneven biasing forces dependent upon the position of the stylus arm 114 relative to its support housing 84 and lack of straightness in the z direction or the inaccuracy in the air bearing of the probe.

As shown in FIGS. 10a and 10b the optical sensing arrangement comprises a single LED 122 supported on an LED support means 120 carried by the support means 118. Photodiodes 132 and 134 are supported on a photodiode support 124 so as to be opposed to the LED 122. The LED 122 is thus arranged such as to emit light towards the photodiodes 132, 134.

The shutter 125 is positioned between the LED 122 and the upper photodiode 132 and is connected to support arm 101 so as to follow the movement of the stylus arm 114 in the z-direction. The shutter is substantially opaque to the light emitted by the LED 122 and will, when positioned in the light path between the LED and the photodiodes at least partially, dependent on its position, block the light path causing a shadow to be cast on at least part of photodiode 132. The boundary of the shadow will, of course, move in with the movement of the stylus arm 114 along the z-axis. Typically the shutter 125 may be a thin sheet of aluminium alloy, which has been blackened, eg. by being anodised.

It will be appreciated from FIG. 10b that support arm 101 will move along the z-axis (up and down) as shown by the arrow A. If, for example, the stylus arm 114 moves downwardly, the support arm 101 and thus the shutter 125 will move downwardly a corresponding distance from the position shown in FIG. 10b causing photodiode 132 to become more obscured from the LED 122 (nb. the LED is not shown in this figure). Conversely when the stylus arm 114 moves upwardly the support arm 101 and thus the shutter 125 will move upwardly a corresponding distance causing photodiode 132 to become less obscured from LED 122. The output signal from the upper photodiode 132 can thus be used to indicate the z-axis position of the probe. Typically this arrangement when used with conventional photodiodes and LED will only provide a linear output in the regions from one quarter to three quarters obscured and the feedback control is preferably operative to maintain the shutter 125 at least within this range.

Figure 11A:
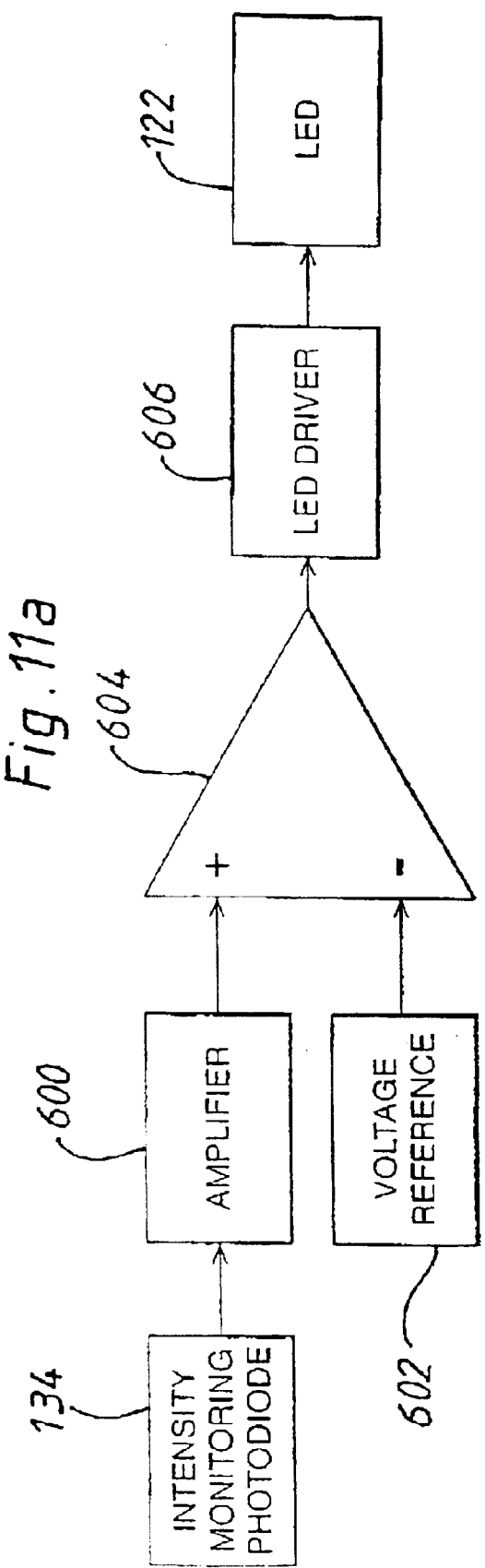
FIGS. 11a and 11b are a schematic diagrams showing the control and signal processing circuitry associated with the optical sensing arrangement.

In this embodiment the lower photodiode 134 is never obscured and the signal provided therefrom is used to monitor the intensity of the light emitted from the LED and to provide a feedback signal such that the intensity of the light emitted therefrom remains constant. Thus, as shown in FIG. 11A, the signal from lower photodiode 134 is passed to amplifier 600 and thence to differential amplifier 602. The other input terminal of the differential amplifier is a reference level fed from a voltage reference 174. The output signal provided by the differential amplifier 602 therefore represents an error or deviation in the light incident upon the lower photodiode from a nominal desired value. The signal output from the differential amplifier is used to adjust the drive current provided for the LED 122 by an LED driver 606 so as to increase or decrease the drive current from a nominal reference value thereby changing the brightness of the LED. The drive current is output from the LED driver 606 so as to drive the LED 122 to maintain the output of the photodiode 134 constant.

Figure 11B:
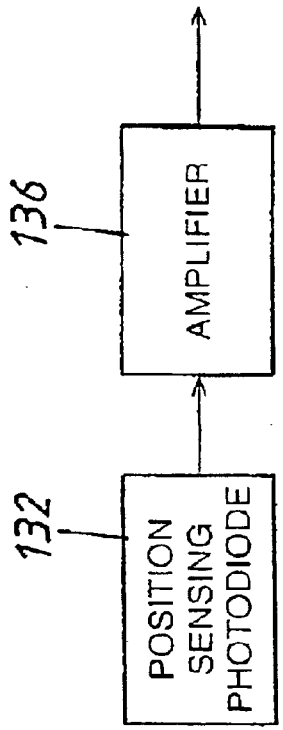

As shown in FIG. 11b, the output from the upper photodiode 132 is supplied via a fixed gain amplifier 136 to the motor driver as described below.

Preferably the LED 122 and photodiodes 132 and 134 are infra-red devices to avoid influence or interference from stray ambient light.

As an alternative to using the lower photodiode 134 for the intensity modulation of the LED 132 as described above, a simple difference signal from the two photodiodes 132, 134 could be used to control the carriage position feedback.

The circuitry discussed above with reference to FIGS. 11a and 11b may be mounted within the housing 84 together with a suitable power source.

The optical measurement system OMS for sensing or measuring the displacement of the stylus arm 114 as it follows a surface being measured will now be described with reference to FIGS. 12 to 15.

The optical measurement system 11, apart from the reflector 105, is mounted, as shown schematically in FIG. 14, on a platform 420 supported on the supports 42a, of which four may be provided.

Figure 13:
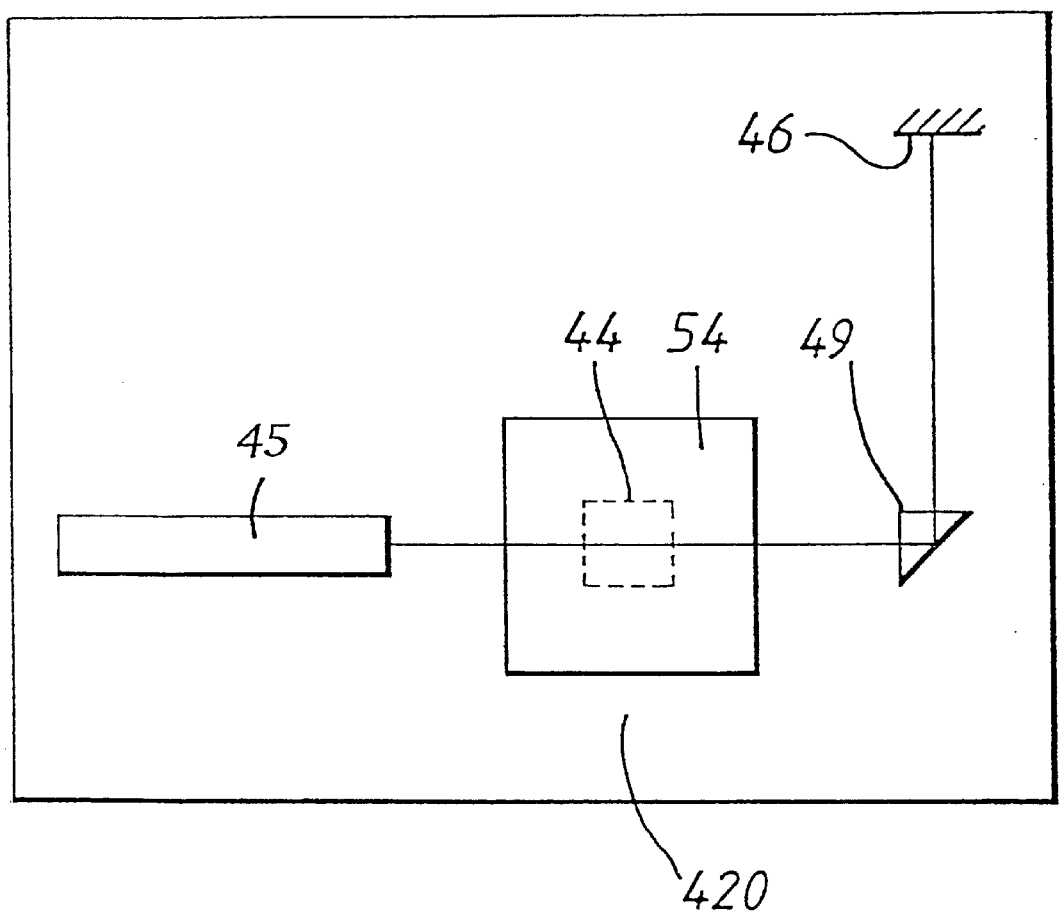
FIG. 13 is a schematic plan view of a support carrying the optical measurement system thereon.

FIG. 13 is a plan view from above of the platform 420 and the components mounted thereon and FIG. 14 is a diagram showing the probe carriage 80 and associated components relevant to the optical measurement system 11.

The optical measurement system OMS comprises an optical interferometer (in this embodiment a laser interferometer) for measuring the displacement of a reflector 105 provided on the stylus arm 114. In the embodiment shown in FIGS. 12–14, the retroreflector is a cat's eye reflector comprising a lens 105a and a mirror 105b located at the focal point of the lens so as to direct the light back along the same path.

Figure 12:
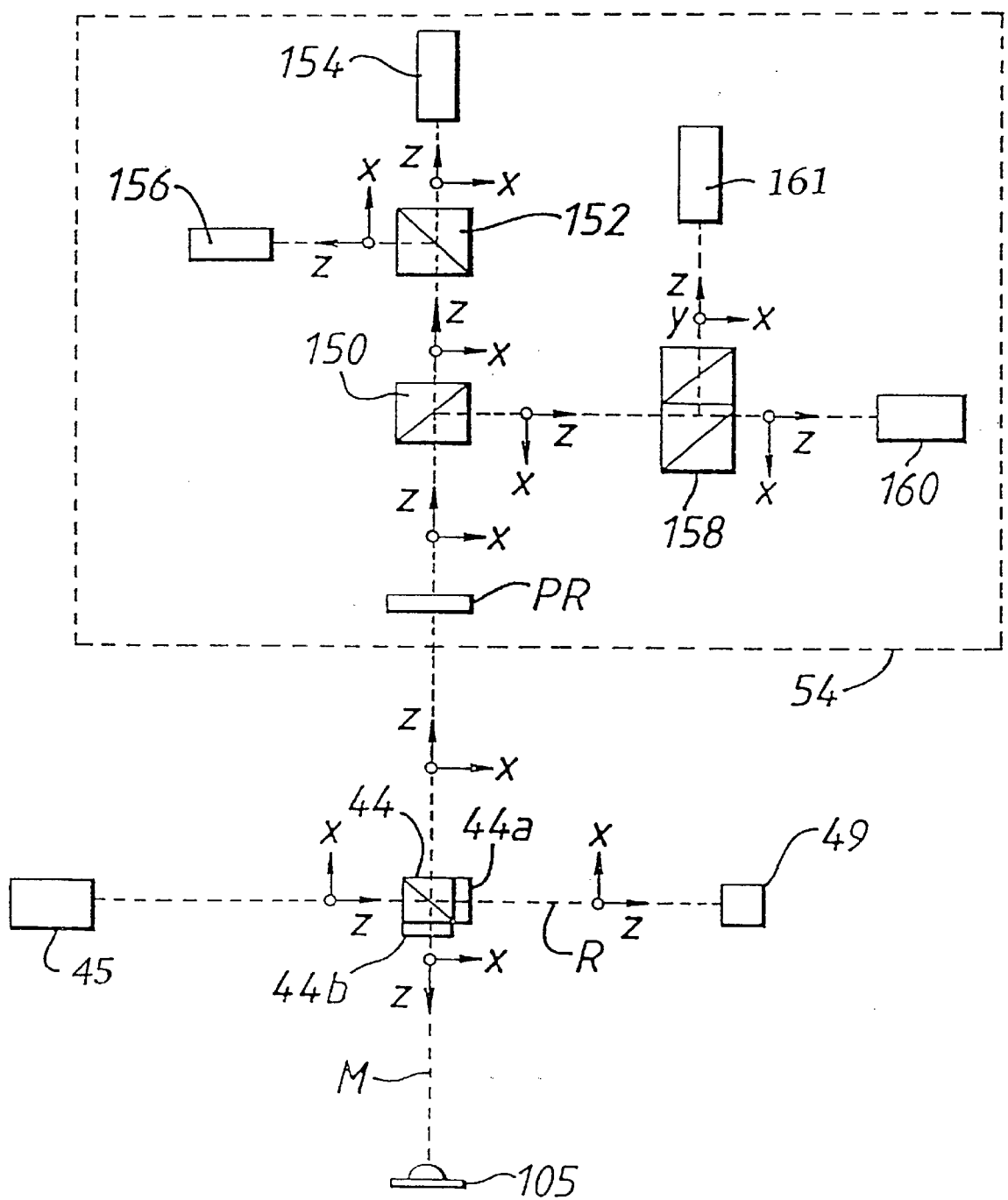
FIG. 12 is a schematic diagram showing an optical measurement system of the apparatus shown in FIG. 1.

The optical interferometer comprises a laser source 45 providing an output beam which is linearly polarised at 45° the x axis in FIG. 12. The output beam is directed toward a polarising beam splitting prism 44 which transmits light polarised in the x direction and reflects light polarised in the y direction. The beam splitting prism 44 thus provides a transmitted reference R beam linearly polarised in the x direction and a reflected measurement beam M linearly polarised in the y direction.

The reference beam having passed through the beam splitter 44 is transmitted via a quarterwave plate 44a on the exit face and then travels parallel to the plane of the of the platform 420 and until it meets a reflector 49 which is arranged to reflect the beam through an angle of 90° (see FIG. 13). The reference beam R thereafter travels to a reflector mirror 46 which reflects the reference beam back along its path (ie back through the 90° reflector 49) to the beam splitter 44. The reference beam now passes back through quarterwave plate 44a and thus is reflected by the beam splitter 44 towards the analysing optics 54 (to be described in greater detail below) mounted above the surface 420 on support 54a.

The measurement beam M is reflected through 90° by the beam splitter 44, passes through quarterwave plate 44b and then travels along the z-axis through an aperture 420a in the platform 420. The measurement beam M then passes through aligned apertures 43e and 43f in the surface 41 and plate 42 down the z-axis parallel to the support slideway 70 into a cylindrical light passage 102 at the top of the probe 84, until striking the reflector 105 provided at the top of the stylus arm 114. Although not shown in the drawings, a cowl or cover secured to the gantry 20 will usually be provided for safety reasons to shield the light beam from an operator. The measurement beam M thereafter returns up light passage 102. The reflected measurement beam re-enters the beam splitter 44 via quarterwave plate 44b and passes straight through it towards the analysing optics 54.

The two co-axial beams are supplied to a further quarterwave plate PR with its principle axis at 45° to the x and y axis. The quarterwave plate PR converts the linearly polarised beams into two circularly polarised co-axial beams of opposite handedness. The two circularly polarised co-axial beams are supplied to a nominally non-polarising beam splitting prism 150 which produces two mutually perpendicular composite beams each consisting of two circularly polarised beams of opposite handedness, containing a phase difference. Each composite beam is incident on a respective polarised beam splitting prims 152 or 158. The beam splitting prism 158 .is rotated through 45° relative the plane of the drawing. Thus, four component beams are produced. The component beams from the beam splitting prism 158 are linearly polarised at angles of 45° and −45° to the x axis while the component beams from the beam splitting prism 152 are linearly polarised at angles of 0 and 90°, that is in the direction of the x and y axis, respectively.

Each component beam is incident on a respective photo-electric detector 154, 156, 160, 161. The photoelectric currents produced by these detectors provide quadrature output signals which are then passed to a counter interpolator 162 (see FIG. 16) which may be as described in WO92/21934 with reference to FIG. 34 thereof, the whole contents of which are hereby incorporated by reference. The counter/interpolator counts the number of fringes and fractions of fringes since the last measurement thereby providing a measure of the distance moved (i.e. the relative change in the surface form of the component being measured) since the last measurement. In the embodiment the typical resolution of the interferometer is 8 mm (nanometers) and the typical range over which measurement can be made is 80 mm.

Figure 15:
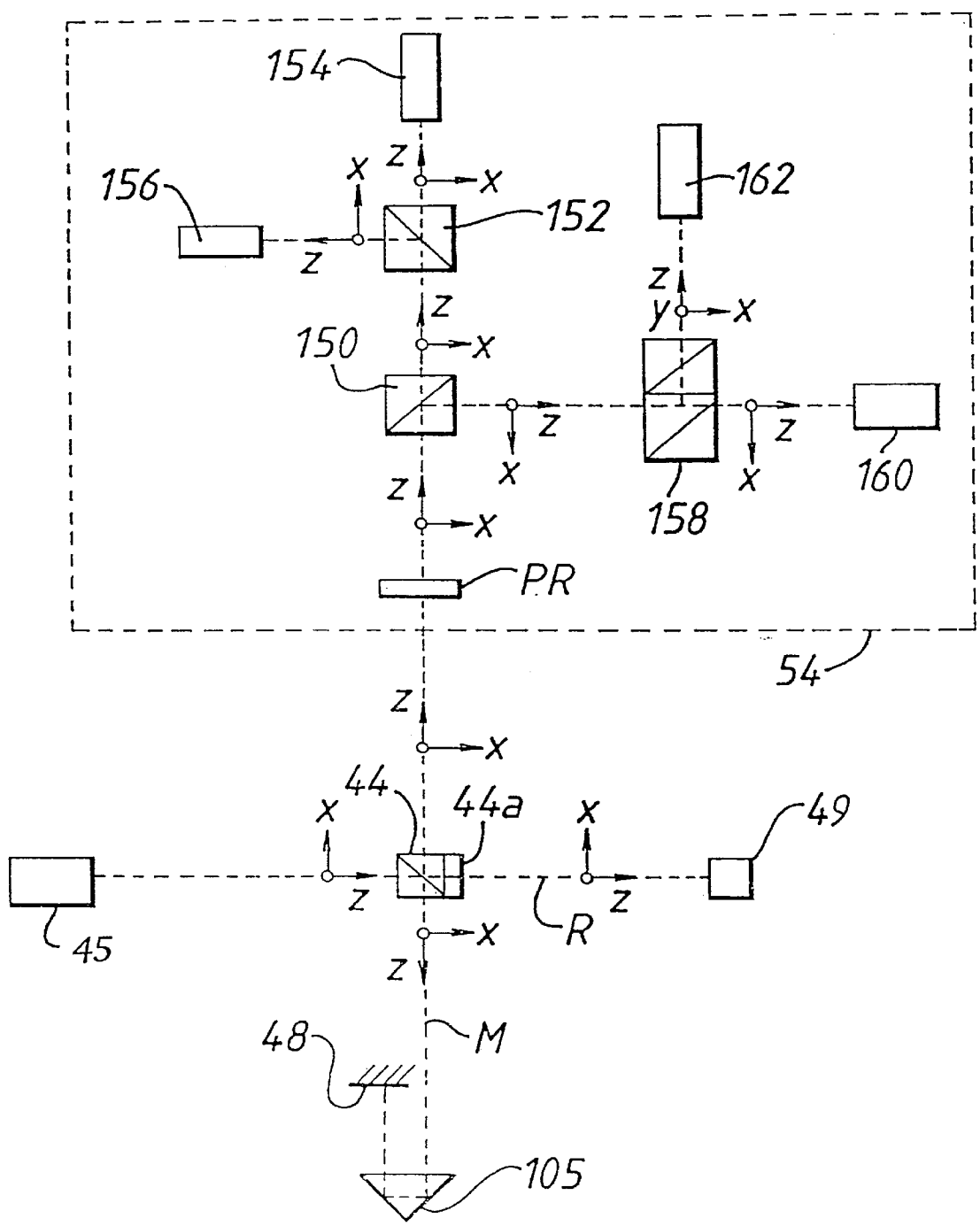
FIG. 15 is a schematic diagram showing an optical measurement system of an alternative embodiment.

In an alternative embodiment the reflector 105 may be a corner cube. Such an alternative embodiment is shown in FIG. 15 and the modifications necessary will now be described. In this alternative embodiment, the reflector 105 is replaced by a corner cube 105' and a mirror 48 mounted on the underside of plate 41 (as shown in phantom lines in FIG. 14). The measurement beam is reflected by corner cube 105' and passes back up the light passage 102 to strike reflector 48. This reflector 48 reflects the measurement beam back along its incident path to strike the corner cube 105' for a second time and thereafter travel back to the prism 44 which in this embodiment does not require the quarterwave plate 44b because the corner cube 105' provides the necessary plane shift. The passage of the measurement beam M to and from fixed reflector 48 via corner cube 105' each time effects a doubling of the phase shift of the measurement beam thus effecting an improvement resolution. Modifications may also be made to the path length of the reference beam if the coherence length of the laser is such that this is necessary. The cat's eye arrangement described earlier uses a single rather than a double path measurement beam which may reduce resolution but may be desirable if there are coherence length problems and thus avoids the necessity of using a mode locked or stabilised laser which reduces costs.

The control circuitry will now be described with reference to FIG. 16.

The control circuitry comprises the master control system 200 which controls the optical measurement system 11; the platform motor control circuitry 12 and the probe carriage motor control circuitry 13. The master control system communicates to a personal computer 15 via a serial link. The PC may be used for user input and may process and display measurement results.

The master control system 200 comprises a micro processor 202, RAM 204, ROM 206 (in the embodiment EPROM) and a SDLC type serial interface 208 to the personal computer 15.

As discussed above the output from the analysing optics 54 of the optical interferometer 164 is passed to counter/interpolator 162 which provides, via a digital input/output interface (unshown), data indicative of the distance moved by the probe since the last measurement to the master control system 200.

The platform motor control circuitry 12 is also controlled by the master control system 200. As noted above, the platform 30 is moved relative to the slideway by the platform motor control circuitry 12 which comprises, as shown in FIG. 16, a linear motor 169, a motor driver 166 a counter/interpolation 168 and an optical transducer 167. Movement of the platform is controlled by the master control system 200 which is interfaced to the motor driver 166. In order to achieve the necessary movement accuracy of the platform 30 in the embodiment, positional feedback is provided internal to the platform motor control unit 12 to the motor driver 166 by the counter/interpolator 168.

The output of the counter/interpolator 168 indicates the progress of the probe 84 along its measurement path and is provided directly to the master control system 200 to determine the distance the probe has moved in the z direction between the previous x position $x_{n-1}$ and the current x position $x_n$.

The probe carriage motor control circuitry 13 comprises the optical sensing arrangement 82, the motor driver 83, the electric motor 50 and shaft encoder 68. The control of the movement of the probe is dependent upon the operation mode of the instrument. When the probe is under user control, for example for positioning before a measurement cycle, the motor driver 83 is controlled by the master control system 200. The user may input commands into the master control system via joystick 210 or alternatively via the personal computer. Positional feedback in this operational mode is provided to the motor driver 83 by the shaft encoder 68.

During a measurement cycle movement of the probe is not controlled from the master control system 200. The probe follows the surface of the component due to the local feedback provided from the optical shutter 82. Such feedback may be analogue in nature which may improve the bandwidth of the instrument.

Such local feedback enables rapid adjustment of the position of the probe relative to the carriage so as to ensure that the probe is brought back into its operational range in the time between measurements made by the optical measurement system OMS of the position of the probe as it traverses the surface being measured.

In operation, a component or workpiece to be measured, for example an aspheric lens, is first positioned on the turntable 36 and secured in place using conventional clamping means (not shown). The user may then effect levelling of the component by rotating the wheels of the three user adjustable bearings of the turntable 36. The user may also adjust the positioning of the turntable in the y direction as discussed above with reference to FIGS. 1, 3 and 4. Additionally or alternatively, computer controlled or software centring and levelling may be used as described in European Patent Application Publication No. 0787280.

Once the component has been correctly positioned and levelled, the user will check using the angle markings on the turn table that the turntable is at t he correct angular orientation and if not will manually rotate the turntable using the knobs provided as discussed above with reference to FIGS. 3 and 4. As an alternative, computer controlled rotation of the turntable may be possible as described above with the user controlling the orientation by inputting instructions using the keyboard 172 or mouse 174 of the PC 170.

When the component and turntable are correctly located, then the user instructs the master control system via the personal computer to commence measurement of a surface profile across the component. The master control system then moves the probe carriage 80 to bring the stylus tip into contact with the surface although this operation may be at least partly performed by a user. Once the master control system has determined that this has been achieved, it relinquishes control of the carriage motor 50 to the optical shutter 82 and motor driver 83 which acts as discussed above to move the probe carriage when necessary to maintain the probe within its operational range preferably at a null position as it follows the surface being measured.

The master control system 200 causes the platform motor driver 166 to drive the motor 169 to cause the platform and thus the turntable and the component mounted thereon to move relative to the probe in the x direction. Signals from the counter/interpolator 168 are supplied both to the motor driver 166 which uses them for positional feedback and directly to the master control system which uses them to log the output of the counter/interpolator 162 into memory 204 thus providing the x-position.

The master control system 200 determines from the logged outputs of the optical measurement system 11 the z position of the probe for each x position and these are also stored in memory 204. The resulting profile may then be sent to the personal computer via serial interface 208 for display or print out of a copy of the profile using the printer 178.

The user may then rotate the turntable through a known angle and instruct the master control system 200 to make another profile measurement. Profile measurements logged by the master control system and made at different orientations of the component relative to the x direction may be transferred to the PC system 15 and processed using known algorithms stored in the PC system 15 to determine whether, in the case where the component is an aspheric lens, whether the component has the required degree of asphericity. A simulated three dimensional profile may be displayed on display 176.

The PC 15 may also store other known data processing algorithms to enable, for example, other significant form characteristics to be calculated from the measured profiles. For example, algorithms for determining the roundness, straightness and/or cylindricity of a component may be provided. Algorithms for determining the crown or crest of a curved surface, that is the maximum displacement or height in the z direction may also be provided. Programs or algorithms and data may be supplied and stored in the PC in any conventional manner.

In the above-described embodiment, as the probe is moved relative to the component along a measurement path, it follows the surface of the component so as to maintain a substantially constant position of the stylus arm relative to its support housing.

This enables the stylus arm to be maintained within a usable measurement range regardless of the actual displacement of the probe which should assist in increasing the measurement range of the instrument.

The use of the separate sensing means for controlling movement of the probe carriage and the optical interferometer for data recording allows local feedback control of the movement of the carriage which should increase the speed of this control and also result in a reduction in the noise associated with such control.

As described above, the stylus arm is movable in an air bearing while the probe carriage is movable along a z-axis air bearing slideway. This should allow the extent over which necessary degree of accuracy in the probe movement can be maintained to be increased.

The ability to rotate the component, in the above description by rotating the turntable, in addition to effecting relative movement between the component and the probe or stylus in the measurement path direction enables measurement paths at angles to one another (i.e. along non-parallel paths) to be traversed which is particularly useful where variations from rotational symmetry, for example the degree of asphericity of an aspheric lens or other optical surface such as a mirror, need to be determined. Where measurement along measurement paths at angles to one another is not required, then the turntable may be omitted. Alternatively, where the component being measured needs only to be rotated during a measurement, for example to measure roundness or cylindricity, then the x axis slideway could be omitted. Also where the turntable is provided, it may be fixed in position, that is the y axis movement of the turntable may be omitted.

As described above, the turntable is movable in the x direction. The turntable could however be fixed in position and the probe carriage mounted to a further carriage itself mounted to the gantry so as to be movable in the x direction in FIG. 1. Also, either additionally or alternatively, the probe carriage could be mounted to a further carriage itself mounted to the gantry so as to be movable in the y direction in FIG. 1 thereby enabling a number parallel traverses of a component to be achieved by moving the probe in the y direction between traverses in the x direction.

As described above, optical position sensing transducers are used, however other position sensing transducers such as LVDTs (Linear Variable Differential Transducer) may be used for, for example, sensing the position of the x axis slideway and the position of the probe relative to the carriage.

In the examples described above, the probe or gauge comprises a stylus tip arranged to contact the component being measured, however the probe could comprise a non-contacting sensor such as an atomic force or optical auto focus or focus follower gauge which follows the surface being measured at a fixed distance. Also the probe could be oriented in a direction other than along the z direction. For example where the roundness or cylindricity of a component is being measured, the probe and probe carriage could extend along and be movable in the x or y direction.

Yet further the air bearings described in the embodiment are preferable features and any suitable bearings could be used.

Further variations and modifications will be apparent to those skilled in the art.

What is claimed is:

1. A metrological apparatus for measuring a surface characteristic of a surface of a workpiece, the metrological apparatus comprising:

a housing;

a probe carriage for carrying an elongate sensing probe having a longitudinal axis so as to allow the elongate sensing probe to move relative to the probe carriage in a measurement direction parallel to the longitudinal axis thereby enabling the elongate sensing probe to follow the surface being measured, wherein the probe carriage is mounted on the housing so as to allow relative movement between the probe carriage and the housing in the measurement direction;

first moving means for causing relative movement between the elongate sensing probe and the workpiece to allow the elongate sensing probe to traverse the surface of the workpiece;

a first sensor for providing a measurement of a displacement of the elongate sensing probe relative to the housing as the elongate sensing probe follows the surface during operation of the first moving means;

an optical sensor for providing a signal indicative of a displacement of the elongate sensing probe relative to the probe carriage;

second moving means for causing relative movement between the probe carriage and the housing in the measurement direction; and a control unit for controlling the second moving means to move the probe carriage relative to the housing in response to the signal provided by the optical sensor to maintain the elongate sensing probe in an operational range.

2. An apparatus according to claim 1 wherein said optical sensor comprises:

light emission means; and light detection means, said light emission means and light detection means being mounted on said probe carriage;

a shutter mounted so as to move with the elongate sensing probe, said shutter being movable between said light emission means and said light detection means wherein, in use, the signal indicative of the position of the probe relative to the probe carriage is emitted by the light detection means.

3. An apparatus according to claim 1 wherein the probe carriage provides an air bearing arrangement for supporting the elongate sensing probe.

4. An apparatus according to claim 1 wherein the first sensor comprises an optical interferometer mounted to the housing apparatus and light reflecting means movable with the elongate sensing probe.

5. An apparatus according to claim 4 comprising a elongate sensing probe having said light reflecting means mounted at an end thereof opposite to a surface sensing end.

6. An apparatus according to claim 1 having an elongate sensing probe comprising an elongate rod fixedly supported partially within an elongate shaft of square outer cross-section, and wherein the probe carriage comprises a square bore for receiving said elongate shaft so that the elongate shaft is movable in the square bore.

7. An apparatus according to claim 1 further comprising biasing means for biasing the elongate sensing probe towards the surface being measured.

8. An apparatus according to claim 7 wherein said biasing means comprise a coil spring.

9. An apparatus according to claim 1 wherein said first moving means comprises a platform movable in a direction perpendicular to the measurement direction.

10. An apparatus according to claim 9 wherein said platform includes means for levelling the workpiece to be measured.

11. An apparatus according to claim 9 wherein said platform includes third moving means for moving the workpiece in a second direction perpendicular to the measurement direction.

12. An apparatus according to any of claims 6 to 11 further comprising biasing means for biasing the probe towards the surface being sensed.

13. An apparatus according to claim 9 wherein said platform further includes a turntable rotatable about an axis which is not parallel to the surface of the platform.

14. An apparatus according to claim 1 further comprising a slideway along which the probe carriage is movable and means supporting said probe carriage on the slideway.

15. An apparatus according to claim 14 comprising a gantry carrying said slideway so that said probe carriage is suspended from the gantry.

16. An apparatus according to claim 15 wherein the second moving means comprises a motor for causing rotation of a feed wheel carrying a cable, said probe carriage being suspended from the gantry by the cable so that rotation of the motor causes movement of the probe carriage up and down the slideway.

17. An apparatus according to claim 16 wherein the feed wheel is driven by the motor via a step down gear box.

18. A method of measuring surface characteristics of a component in a measurement direction, the method comprising the steps of:

causing relative movement between a surface sensing probe and a component to allow the probe to traverse a surface of the component;

supporting the probe using a probe carriage so as to allow the surface sensing probe to move as a body in the measurement direction relative to the probe carriage so as to follow the surface being sensed;

optically sensing the displacement of the surface sensing probe relative to the probe carriage;

controlling the movement of the probe carriage in the measurement direction in response to said displacement sensed in the optically sensing step so as to maintain the surface sensing probe in an operational range; and further sensing the displacement of the surface sensing probe in the measurement direction as it follows the surface.

* * * * *